Feb. 27, 1962 A. F. BARTELS 3,022,902
BALE TURNER
Filed Oct. 8, 1959
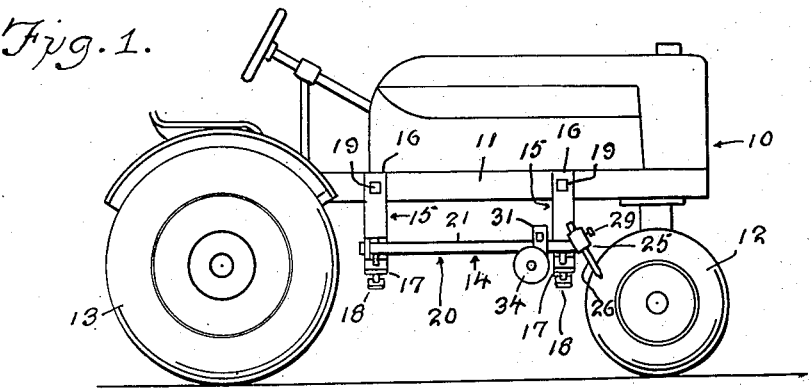
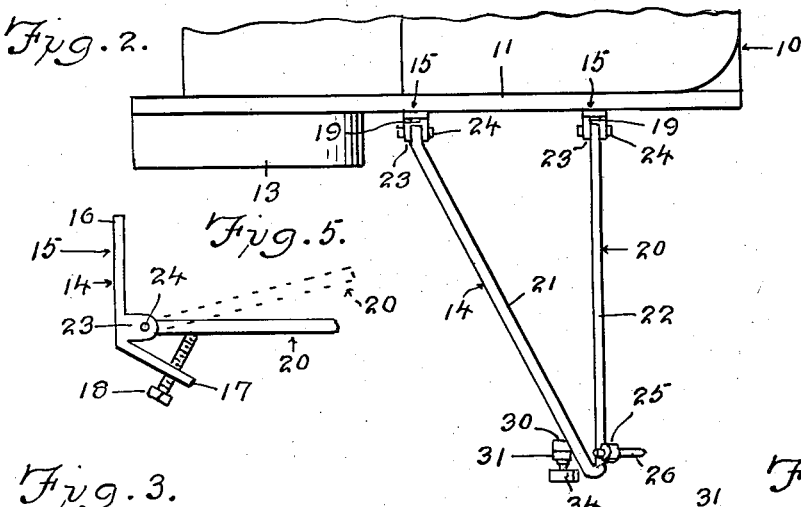
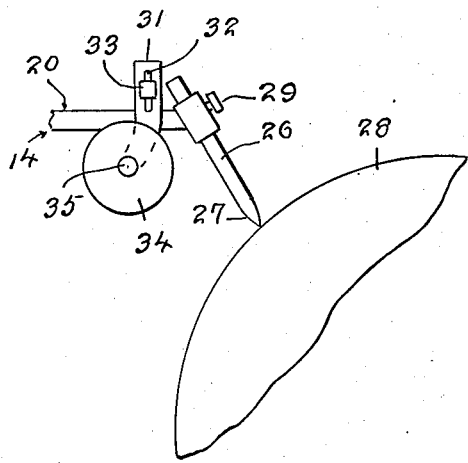
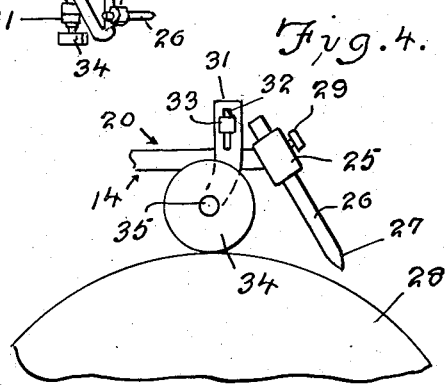
INVENTOR.
*August F. Bartels*
BY
*Victor J. Evans & Co.*
ATTORNEYS

United States Patent Office 3,022,902
Patented Feb. 27, 1962

3,022,902
BALE TURNER
August F. Bartels, R.R. 1, Bellevue, Iowa
Filed Oct. 8, 1959, Ser. No. 845,264
3 Claims. (Cl. 214—1)

This invention relates to an agricultural implement, and more particularly to a bale turner for use with a vehicle such as a tractor.

The object of the invention is to provide a device which is adapted to be attached to the side of a vehicle such as as a tractor, whereby bales of hay, straw or the like can be conveniently turned or rotated as the tractor moves along a field.

Another object of the invention is to provide a bale turner which will facilitate the turning of bales of hay in the field so as to insure that the bales can be promptly and efficiently dried out and wherein the bales can be turned without the necessity of the operator getting off of the tractor and wherein it will not be necessary to turn the bales by hand so that the bales can be turned more efficiently and quickly and readily.

A further object of the invention is to provide a bale turner which is extremely simple and inexpensive to manufacture.

Other objects and advantages will be apparent during the course of the following description.

In the accompanying drawing, forming a part of this application, and in which like numerals are used to designate like parts throughout the same:

FIGURE 1 is a side elevational view illustrating the bale turner of the present invention attached to a tractor.

FIGURE 2 is a fragmentary top plan view.

FIGURE 3 is a fragmentary view illustrating certain constructional details of the present invention.

FIGURE 4 is a view similar to FIGURE 3, but showing the roller in engagement with a bale.

FIGURE 5 is a fragmentary sectional view illustrating one of the screw members which functions as a minute stop member.

Referring in detail to the drawing, the numeral 10 indicates a conventional tractor which includes the usual side beam 11 as well as front and rear wheels 12 and 13, FIGURE 1.

According to the present invention there is provided a bale turning mechanism which is indicated generally by the numeral 14, and the bale turning mechanism 14 includes spaced apart bars 15 which each include a radially disposed main body portion 16 that is secured in place to the beam 11 with any suitable manner, as for example by means of securing elements 19.

Each bar 15 further includes an inclined lip 17 on its lower end, FIGURE 5, and an adjustable screw member 18 extends through the lip 17 for a purpose to be later described.

There is further provided a pivotally mounted frame member or support member 20 which includes angularly arranged sections or arms 21 and 22, and the ends of the sections 21 and 22 are pivotally connected to ears 23 which are arranged on the lower ends of the bars 15 by means of pivot pins 24, FIGURE 5. The screw members 18 are adapted to be arranged below the sections 21 and 22 so as to limit downward swinging movement of the sections 21 and 22 and by adjusting the screw members 18 the amount of pivotal movement of the frame member 20 about the pivot pin 24 can be regulated or controlled as desired.

Secured to the outer front portion of the frame member 20 in any suitable manner, as for example by welding, is a bushing 25, and a prong or pin 26 is adjustably mounted in the bushing 25. The prong 26 includes a lower pointed end 27 which is adapted to engage a bale 28 which is to be turned or rotated, FIGURE 3 and FIGURE 4. The numeral 29 indicates a set screw which extends through the bushing 25 and engages the prong 26, and by loosening the set screw 29 the prong 26 can be adjusted to the desired position and then after the prong 26 is moved to the desired position, the set screw 29 is adjusted or tightened in order to maintain the prong immobile in its adjusted position.

There is further provided a shoulder 30 which is secured to or formed integral with the section 21 of the frame member 20, FIGURE 2, and an adjustable arm 31 which is provided with a slot 32 is arranged contiguous to the shoulder 30, the arm 31 being positioned rearwardly of the prong 26. A securing element 33 extends through the slot 32 in the arm 31 and engages the shoulder 30, so that by loosening the securing element 33, the position of the arm 31 may be adjusted as desired and then after the arm has been moved to the desired position, the securing element is adapted to be tightened. A roller or wheel 34 is journalled on the lower end of the arm 31 as at 35, and the roller 34 is adapted to engage the bale 28, as for example as shown in FIGURE 4 so as to help lift the prong 26 out of engagement with the bale at the proper time.

From the foregoing, it is apparent that there has been provided a bale turner which is especially suitable for use in turning bales such as the bale 28. In use, with the parts arranged as shown in the drawing, it will be seen that the bars 15 are adapted to be secured to the side of the tractor 10 as for example by means of the securing elements 19, and the ears 23 on the lower portions of the bars 15 provide a pivotal support for the sections 21 and 22 of the frame 20 due to the provision of the pivot pins 24. Carried by the outer end of the frame 20 is a prong 26 which can be adjusted up or down, and positioned rearwardly of the prong 26 is a roller 34. It will be seen that as the tractor 10 moves along a field, the prong 26 will have its pointed end 27 engage a bale 28, as for example as shown in FIGURE 3 so that the bale 28 will be turned or rotated. Then, the roller 34 will engage the bale 28 and this will have the effect of pivoting the frame 20 upwardly about the pivot pins 24 so that the prong 26 can move out of engagement with the bale 28 after the bale has been turned or rotated the desired amount. Thus, the bales such as the bale 28 can be turned without the necessity of the operator getting off of the tractor so that a plurality of bales can be quickly and readily turned or rotated.

The parts may be made of any suitable material and in different shapes and sizes.

Many farmers when baling hay, bale the hay in round bales and then leave the bales in the field. Periodically the farmer has to go out in the field and turn the bales so that the underside will dry out and they have to be turned and dried out before the bales are hauled into the barn. This is a very difficult job to carry these bales by hand and turn them and it takes considerable time and effort. With the present invention a farmer can get on a tractor and turn the bales without the necessity of getting off the tractor so that a time saving device is provided wherein the farmer will be saved from being bitten by snakes or insects which are many times under the bales in the field.

The wheels 34 can be adjusted or lowered and raised in order to determine the amount of turn that is desired to give to the bales. The wheels 34 serves to lift the spike or prong 26 out of the bale and the wheels 34 roll over the bales. The spike or prong 26 extends downwardly and slightly forward as for example as shown in FIGURE 1 and this prong touches the bale and does the turning. The pivot pins 24 permit the frame and prong to raise up so as to pass over the bale.

Minor changes in shape, size and rearrangement of details coming within the field of invention claimed, may be resorted to in actual practice, if desired.

What is claimed is:

1. In an agricultural implement, a tractor, a bale turning mechanism operatively connected to the tractor, said bale turning mechanism comprising first and second spaced apart bars each including a radially disposed portion secured to the side of the tractor, an inclined lip on the lower end of each bar, an adjustable screw member extending through said lip, a pair of spaced apart apertured ears extending outwardly from the lower end of said radially disposed portion immediately adjacent to said apertured ears, a frame member including first and second angularly arranged sections hingedly connected to said ears at their inner ends and integrally joined together at their outer ends, said sections adapted to engage said screw members, to limit the downward movement of said sections, a bushing affixed to the outer end of one of said sections adjacent the integrally joined ends of said sections, a pointed prong mounted in said bushing, an arm positioned rearwardly of said prong and adjustably connected to the outer end of the other of said sections adjacent the integrally joined ends of said sections, and a wheel connected to said arm.

2. In a bale turner, first and second spaced apart bars each including a vertically disposed main body portion, an inclined lip on the lower end of each bar, an adjustable screw member extending through said lip, a pair of spaced apart apertured ears extending outwardly from the lower end of the main body portion, a frame member including first and second angularly arranged sections pivotally connected to said ears, said sections adapted to engage said screw members, a bushing affixed to said frame member, a pointed prong mounted in said bushing, an arm positioned rearwardly of said prong and adjustably connected to said frame member, and a wheel connected to said arm.

3. In a bale turner, first and second spaced apart bars each including a vertically disposed main body portion, an inclined lip on the lower end of each bar, an adjustable screw member extending through said lip, a pair of spaced apart apertured ears extending outwardly from the lower end of the main body portion, a frame member including first and second angularly arranged sections pivotally connected to said ears, said sections adapted to engage said screw members, a bushing affixed to said frame member, a pointed prong mounted in said bushing, an arm positioned rearwardly of said prong and adjustably connected to said frame member, and a wheel connected to said arm, and a set screw extending through the bushing and engaging the prong.

References Cited in the file of this patent

UNITED STATES PATENTS

| 684,507   | Goss    | Oct. 15, 1901 |
| 2,682,820 | Ludema  | July 6, 1954  |
| 2,792,136 | Abbott  | May 14, 1957  |
| 2,812,864 | Martell | Nov. 12, 1957 |

FOREIGN PATENTS

| 338,806 | Italy | Mar. 31, 1936 |